US007041927B2

(12) United States Patent
DeWitt et al.

(10) Patent No.: US 7,041,927 B2
(45) Date of Patent: May 9, 2006

(54) METHOD AND APPARATUS FOR PROCESSING OUTGOING BULK MAIL

(75) Inventors: Robert R. DeWitt, Moorsetown, NJ (US); George L. Hayduchok, Mount Holly, NJ (US)

(73) Assignee: Opex Corporation, Moorestown, NJ (US)

( * ) Notice: Subject to any disclaimer, the term of this patent is extended or adjusted under 35 U.S.C. 154(b) by 98 days.

(21) Appl. No.: 10/101,642

(22) Filed: Mar. 20, 2002

(65) Prior Publication Data

US 2002/0134707 A1 Sep. 26, 2002

Related U.S. Application Data

(62) Division of application No. 09/816,687, filed on Mar. 23, 2001, now Pat. No. 6,613,998.

(51) Int. Cl.
*B07C 7/01* (2006.01)
*G06K 5/01* (2006.01)

(52) U.S. Cl. ...................... 209/584; 209/900; 209/583; 700/225

(58) Field of Classification Search ................ 209/584, 209/900, 583
See application file for complete search history.

(56) References Cited

U.S. PATENT DOCUMENTS 4,739,479 A 4/1988 Katsuragawa et al.
5,262,623 A * 11/1993 Batterman et al. .......... 235/454
5,441,159 A 8/1995 DeWitt et al.
5,538,138 A 7/1996 Reich
5,703,783 A * 12/1997 Allen et al. ................. 700/213
5,842,693 A 12/1998 Stevens et al.
6,124,561 A 9/2000 Botzang et al.
6,169,936 B1 1/2001 Lohmann (Continued)

FOREIGN PATENT DOCUMENTS

DE 40 00 603 7/1991

(Continued)

OTHER PUBLICATIONS

U.S. Appl. No. 09/904,471 filed Jul. 13, 2001 entitled "Method and Apparatus for Processing Outgoing Bulk Mail".

*Primary Examiner*—Donald P. Walsh
*Assistant Examiner*—Jonathan R Miller
(74) *Attorney, Agent, or Firm*—Stephen H. Eland; Dann, Dorfman, Herrell and Skillman

(57) ABSTRACT

A method and apparatus for processing mail is provided. The mail is serially fed from a stack of mail into a system transport. The system transport conveys the mail to an imaging station, which scans the mail to obtain image data corresponding to at least a portion of each piece. From the imaging station, the mail is conveyed to a buffer, which selectively maintains the mail while the address printed on the mail is determined. After the address for a piece of mail is determined, the piece is conveyed out of the buffer to a printer, which prints a POSTNET barcode onto the piece. The POSTNET barcode corresponds to the address that was determined for the piece. Optionally, the apparatus may include a labeler for applying a blank label onto the mail, and the POSTNET barcode can then be printed onto the label after it is applied to the mail. After the POSTNET barcode is printed on a piece, it is conveyed past a verifier, which scans the printed POSTNET barcode to ensure that the barcode was printed properly. The mail is then sorted and stacked in a plurality of output bins.

9 Claims, 7 Drawing Sheets

U.S. PATENT DOCUMENTS

| | | | | |
|---|---|---|---|---|
| 6,610,955 | B1 * | 8/2003 | Lopez | 209/584 |
| 6,894,243 | B1 * | 5/2005 | Avant et al. | 209/584 |
| 2002/0029202 | A1 * | 3/2002 | Lopez | |

FOREIGN PATENT DOCUMENTS

| | | |
|---|---|---|
| EP | 0 429 118 | 5/1991 |

* cited by examiner

METHOD AND APPARATUS FOR PROCESSING OUTGOING BULK MAIL

PRIORITY APPLICATIONS

The present application is a divisional application of U.S. patent application Ser. No. 09/816,687 now U.S. Pat. No. 6,613,998, filed Mar. 23, 2001, which is hereby incorporated herein by reference.

FIELD OF THE INVENTION

The present invention relates to the field of processing bulk mail. More specifically, the present invention relates to a method and apparatus for scanning pieces of mail to determine the addresses on the mail and printing the corresponding POSTNET barcodes on the mail.

BACKGROUND

Bulk mail accounts for a significant portion of the mail delivered by the United States Postal Service. The post office offers reduced postage rates for mail that is pre-processed. Essentially, the United States Postal Service charges less postage if the sender makes it easier for the post office to deliver the mail. To qualify for reduced rates, the processed mail must meet certain criteria set forth in various postal regulations. These criteria include the features such as printing the POSTNET barcode on the pieces of mail and ensuring that the pieces have a clear zone that is free of printing.

Frequently, high-volume machines are employed to pre-process mail so that the mail qualifies for the reduced postage rates. These machines scan each piece of mail and attempt to read the address printed on each piece. If the address for a piece is read, the machine then prints the appropriate POSTNET barcode on the piece. However, often these machines reject many pieces because the address could not be read. This creates a significant volume of mail that typically is processed manually or using semi-automated techniques, both of which increase the cost of pre-processing the mail.

SUMMARY OF THE INVENTION

In light of the foregoing, the present invention provides an apparatus for processing mail. Preferably, the apparatus is particularly suited to process mail having information that is difficult to read during high-volume processing.

In one embodiment, an apparatus is provided, which includes an input bin for receiving a stack of mail. A feeder serially feeds pieces of mail from the input bin into a transport along a transport path. An imaging station disposed along a transport path is operable to scan the pieces of mail to obtain image data corresponding to at least a portion of each piece of mail. A buffer positioned along a transport path holds or maintains a piece of mail while the image data for the piece of mail is processed. An image processor processes the image data for the piece of mail to determine a characteristic of the piece of mail. The apparatus also includes a controller that is operable to control the transport to advance the piece of mail out of the buffer in response to the determination of the characteristic for the piece of mail.

Another aspect of the invention provides an apparatus for processing documents comprising a feeder operable to serially convey documents along a transport path. An imager disposed along the transport path is operable to scan documents to obtain a set of image data corresponding to documents. A processor is provided that is operable to analyze the image data to detect the presence of a characteristic. A labeler is also provided that is operable to selectively apply labels to documents having the characteristic.

The present invention also provides several methods for processing bulk mail. According to one method, a piece of mail is fed from a stack of mail into a mail path. The piece of mail is transported along the mail path and scanned to acquire image data corresponding to at least a portion of the piece of mail. The image data is processed to determine a characteristic of the piece of mail, and the piece of mail is maintained at a buffer along the mail path while the image data is processed. The piece of mail is then advanced away from the buffer after the characteristic is determined.

The present invention also provides a method for processing a plurality of documents, in which a plurality of documents are maintained within a buffer. Specifically, documents are serially fed from a stack into a transport path. The documents are scanned to acquire image data corresponding to at least a portion of the documents. The scanned documents are conveyed to a buffer, and a plurality of documents are maintained within the buffer. The image data for the plurality of documents in the buffer is analyzed while the documents are together in the buffer to determine a characteristic of each document in the buffer.

Yet another aspect of the present invention provides a method for processing documents in which a document is scanned to determine a characteristic of the document. A label is adhered to the document and a marking is printed onto the document, such that the marking corresponds to the determined characteristic. Such a method could be utilized when processing either incoming or outgoing mail, in situations in which a clear zone is created to print a bar code or other indicia related to the recipient of the document.

Yet another aspect of the invention relates to a method for processing documents in which the documents are scanned to obtain a set of image data corresponding to the documents. The image data is analyzed to detect the presence of a characteristic. Labels are then selectively applied to documents having the characteristic.

DESCRIPTION OF THE DRAWINGS

The foregoing summary as well as the following detailed description of the preferred embodiments will be best understood when read in conjunction with the following drawings, in which.

DETAILED DESCRIPTION OF THE PREFERRED EMBODIMENTS

Referring now to figures in general, a mail processing device 10 is illustrated. The device 10 is able to process different types of mail. However, the preferred embodiment is particularly suited to process mail having an address that is difficult to read. The device 10 scans the pieces of mail to read the address on each piece. Since the address on a piece of mail may be difficult to read, the piece may be held in a buffer 50 while the device determines the address. After the address is read, the proper POSTNET barcodes is printed on the piece, and the piece is then sorted.

Figure 1:
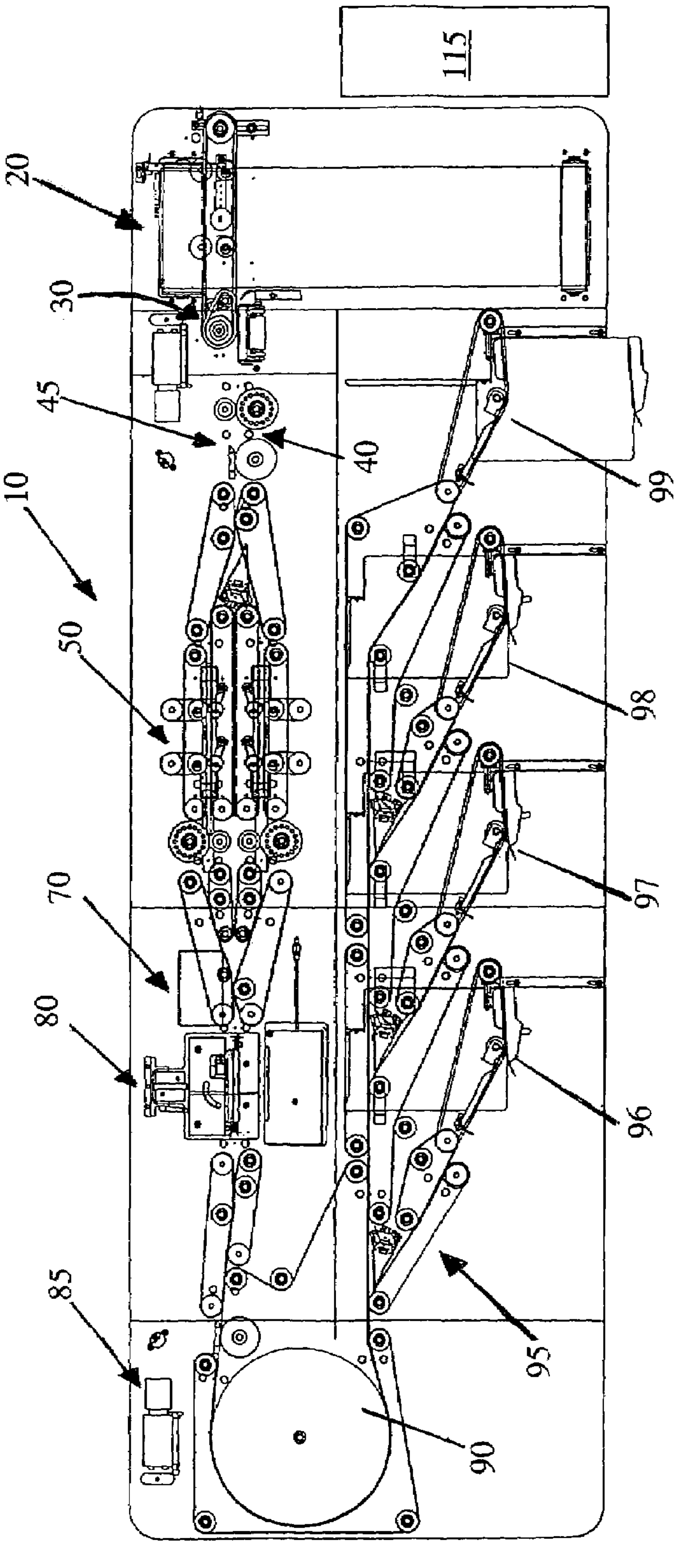
FIG. 1 is a plan view of a device for processing bulk mail.

The following description provides an overview of the device. Referring to FIG. 1, the device 10 includes a feeder module 20 for receiving a stack of mail. A feeder 30 serially feeds the mail from the feeder module into a system transport 40. The system transport conveys the pieces through an imaging section 45, which scans each piece to obtain image data corresponding to the address printed on each piece.

After a piece is imaged, the device 10 analyzes the image data to determine the address printed on the piece. In some instances, this analysis may be accomplished "on the fly" as the piece is conveyed along the system transport. However, preferably, the device 10 includes a buffer 50 to hold the piece to provide additional time to analyze the image data for the piece. From the buffer 50, the system transport conveys the piece to a printer 80 that prints the appropriate barcode on the piece, based on the address determined during the analysis of the image data. Some mail may have printing on it in the area in which the POSTNET code is to be printed. This printing would interfere with subsequent attempts to read the POSTNET code. Accordingly, the device 10 may include a labeler 70 for applying blank labels onto the mail. The printer 80 can then prints a POSTNET code onto the blank label.

From the printer 80, the system transport 40 conveys the piece past a verifier 85, which scans the printed POSTNET code to ensure that it was properly printed. The piece is then conveyed to a stacker 95, which sorts the mail into a plurality of bins. The mail can be sorted into the bins according to various criteria, as discussed further below.

A system controller 100 controls the flow of mail through the device 10. In one mode, the mail flows through the device at a constant rate. In this mode, the feeder 30 serially feeds the mail into the system transport 40 at a pre-determined rate to provide a constant gap or pitch between pieces. In such a mode, the device has a set period of time to analyze each piece to read the address.

In the constant feed mode, the processing time for each piece may not be optimized, because the amount of time allotted to process the images is the same for each piece. However, the actual time to process a piece may be more or less than the set time, because the actual processing time depends on various factors, such as the clarity of the printed address.

Accordingly, preferably, the device 10 utilizes a staged flow, which can optimize the processing time for the pieces. In the staged flow mode, the flow of mail is controlled by the actual amount of time it takes to process each image. Specifically, the system controller controls the flow so that the pieces are advanced as soon as the address is determined. For instance, a piece may be maintained in the buffer 50 while the address is determined. As soon as the address of the piece is determined, the piece is advanced from the buffer 50, and the feeder 30 feeds a new piece into the mail flow, rather than waiting for a pre-set time period to expire.

A system computer 110 allows an operator to interface with the system controller 100. The system computer 110 is the primary interface with the system controller 100 for controlling the operation of the apparatus 10. The system computer includes a monitor to display information regarding the processing of documents. A keyboard 115 is also provided to allow the operator to input various information necessary to process a group of documents, such as the type of transactions in a batch to be processed. Preferably, the system computer 110 also processes the image data obtained in the imaging section 45. In addition, a separate verifier computer 125 may be provided for processing image data obtained by the verifier.

The details of the different elements of the device 10 will now be described in greater detail. After that, the details of the method of operation for the device is described in greater detail.

Feeding Mail

Figure 2:
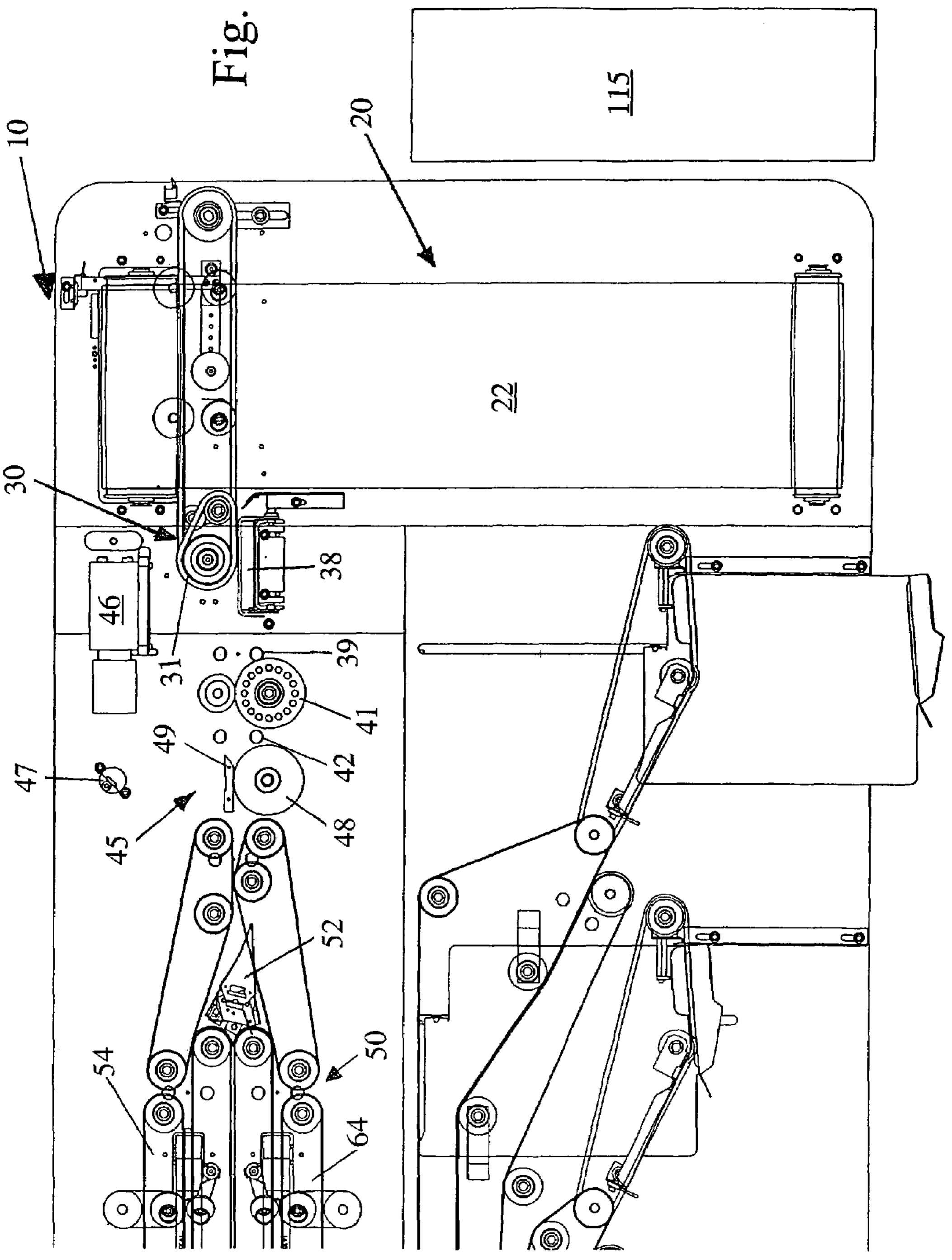
FIG. 2 is an enlarged plan view of the right-hand portion of the device illustrated in FIG. 1.
Figure 3:
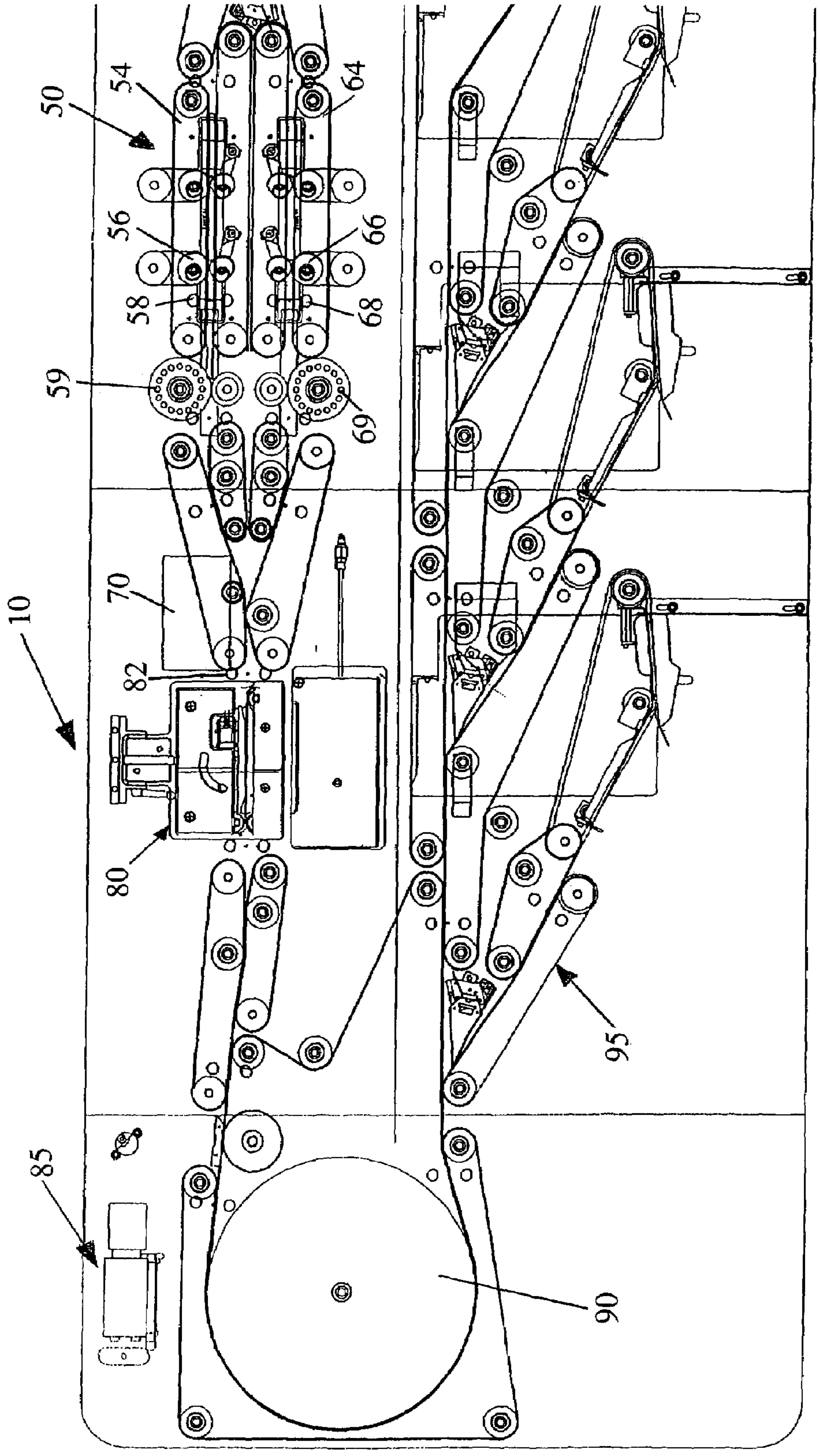
FIG. 3 is an enlarged plan view of the left-hand portion of the device illustrated in FIG. 1.
Figure 4:
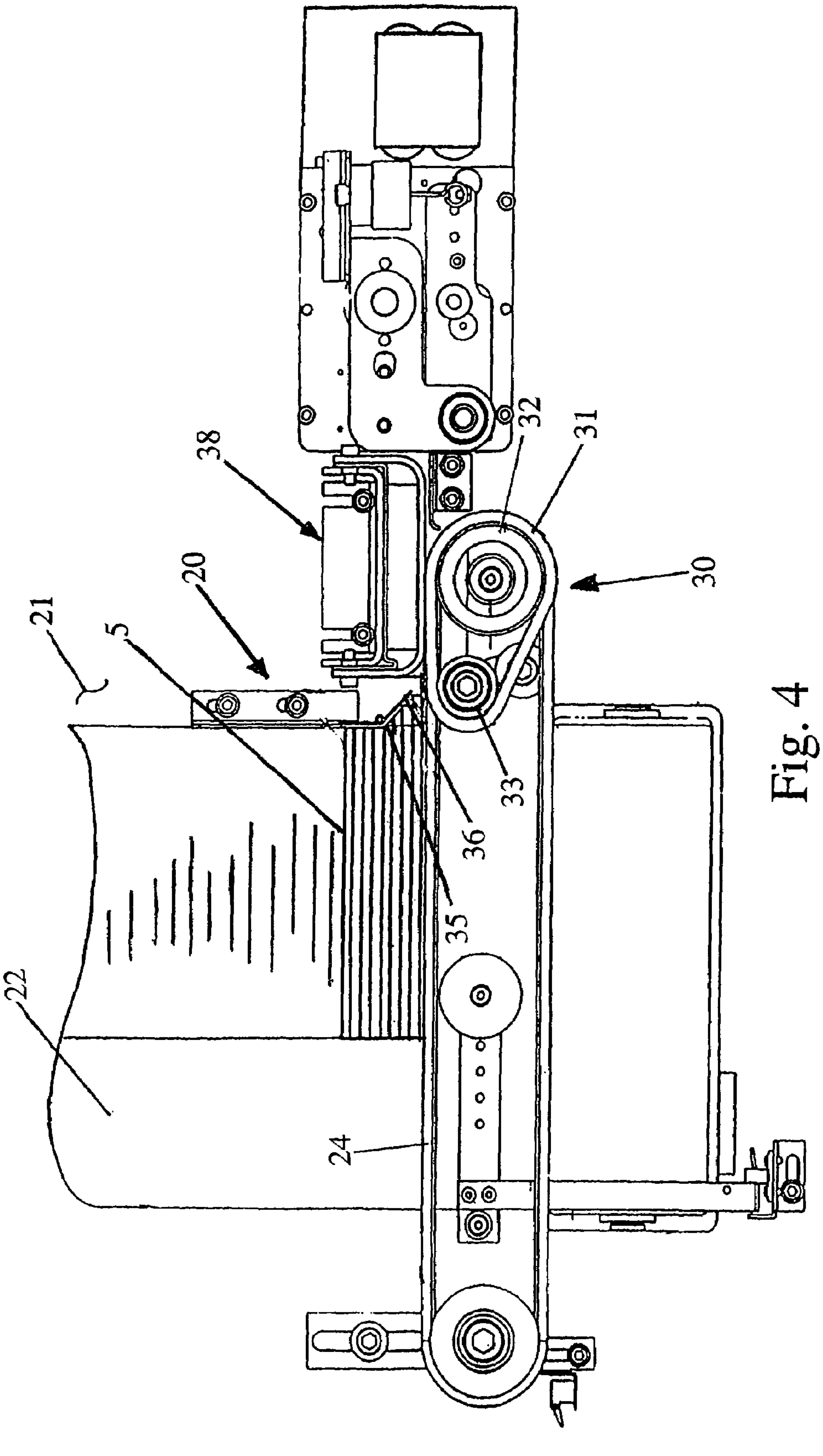
FIG. 4 is an enlarged fragmentary plan view of a feeder module of the device illustrated in FIG. 1.
Figure 5:
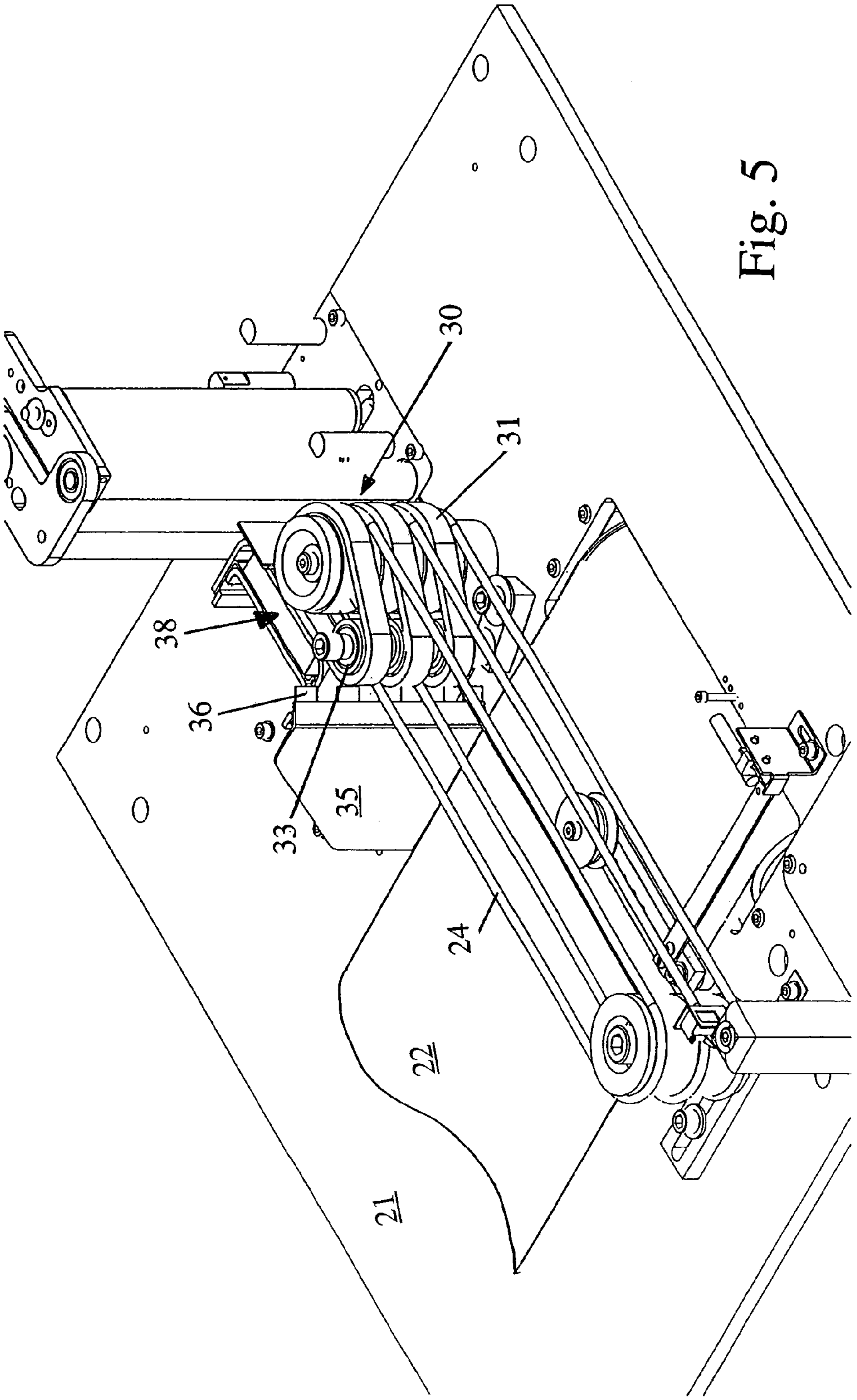
FIG. 5 is an enlarged fragmentary perspective view of the feeder module illustrated in FIG. 4.
Figure 6:
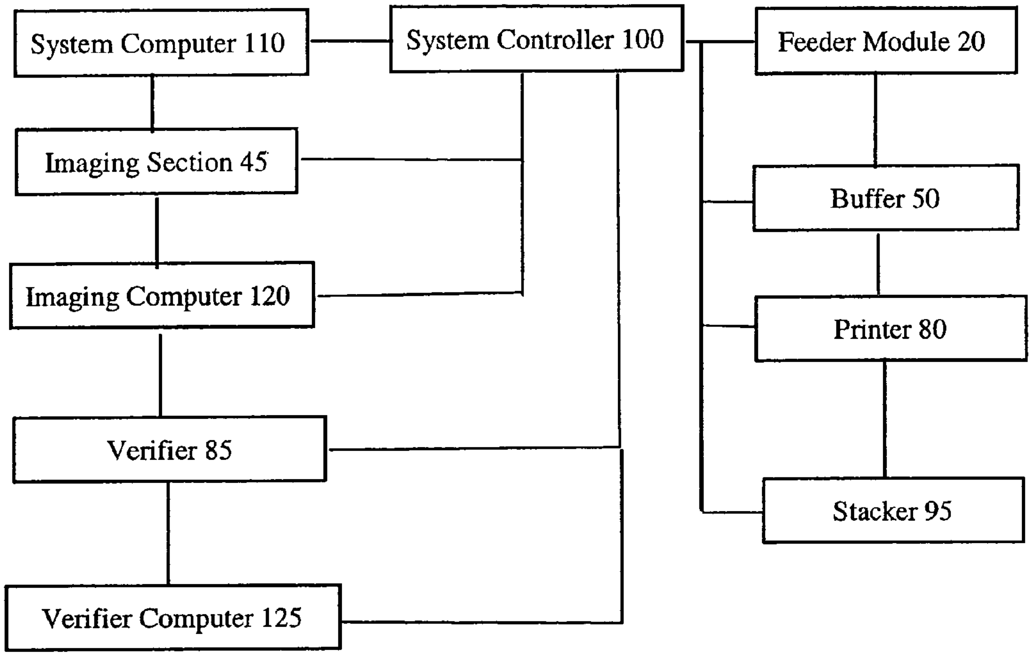
FIG. 6 is a block diagram illustrating the interconnection of the components of the device illustrated in Fig. the 1.

Referring now to FIGS. 2, 4 and 5, the details of the feeding module 20 are illustrated. The feeding module 20 includes a conveyor 22 that conveys a stack of mail 5 toward a feeder 30 that serially feeds the mail toward the imaging station 45. The conveyor 22 comprises a flat conveyor belt disposed generally parallel to a base plate 21 of the feeding module 20. The conveyor 22 is preferably wider than the mail, and forms a generally planar surface for receiving the stack of mail as shown in FIGS. 1 and 2.

From the perspective of FIG. 4, the conveyor 22 conveys the stack of envelopes downwardly toward a plurality of pre-feed belts 24. The pre-feed belts 24 urge the lead piece in the stack of mail 5 toward the feeder 30. As shown in FIG. 5, the feeding module 20 preferably includes three pre-feed belts 24 vertically separated from one another. As the pre-feed belts 24 urge the mail forwardly, a guide 35 guides the mail toward the feeder 30. The mail passes through an opening between the guide 35 and the feeder 30. This opening is referred to as a feed slot. Preferably, a pivotable hinge plate 36 attached to the guide plate extends into the feed slot. The hinge plate 36 is biased into the feed slot so that in its relaxed position, the hinge plate operates to reduce the thickness of the feed slot. By reducing the thickness of the feed slot, the hinge plate 36 reduces the number of pieces of mail that can be readily fed through the feed slot to the feeder 30 simultaneously. In addition, since the hinge plate is pivotable, when a thick piece of mail engages the hinge plate 36, the piece of mail displaces the hinge plate away from the feed slot so that the piece of mail can fit through the feed slot.

As shown in FIG. 5, the feeder 30 comprises a plurality of vertically spaced apart feed belts 31 entrained around a drive pulley 32 and an idler pulley 33. In addition, the pre-feed belts 24 are also entrained about the feeder drive pulley 32, so that the feeder drive pulley 32 drives the feed belts 31 and the pre-feed belts 24. The pre-feed belts 24 urge the mail along a document path toward the feeder 30. The feeder 30 serially feeds the mail along the document path toward the imaging station 45.

The feeding module 20 is configured to reduce or eliminate double feeds, which refers to the problem of simultaneously feeding more than one piece of mail at a time. In particular, the feeding module 20 includes a retard assembly 38 confronting the feeder 30. The retard assembly 38 operates to engage and hold back trailing pieces of mail while the feeder 30 feeds the lead piece of mail away from the stack. If two pieces of mail are simultaneously fed into the document path between the retard assembly 38 and the feeder 30, the trailing piece engages the retard assembly 38 and the leading piece engages the feeder 30.

A feed staging sensor 39 adjacent the feeder 30 senses the mail as it is held in the feeder, if desired, ready to be fed into the system transport 40. This feed staging sensor 39 can be one of a number of different types of known sensors for detecting documents. In the present instance, the sensor 39 is an infrared sensor having a transmitter positioned on one side of the mail path and a receiver positioned on the other side of the mail path, so that the mail flows between the transmitter and the receiver. As discussed below, there are several other sensors positioned along the transport path to detect the flow of mail at various stages. Preferably, the sensors are also infrared sensors configured similar to the feed staging sensor 39.

From the feeder 30, the mail enters the system transport 40, which conveys the mail along the transport path as the mail is processed. Preferably, the entry to the system transport 40 comprises a pullout nip 41 formed between two opposing rollers. One of the two rollers is a driven rollers, so that the pullout nip can advance the mail when it enters the pullout nip. The frictional force between the pullout nip 41 and the mail is greater than the frictional force between the mail and the feeder belts 31 of the feeder 30. Therefore, the pullout nip 41 is able to pull the piece of mail out of the feeder 30.

The pullout nip 41 conveys the piece of mail forward into the imaging section 45. A feeder exit sensor 42 adjacent the pullout nip senses the leading edge of the piece as it exits the feeder 30 and enters the imaging section 45. In addition to detecting the leading edge of each piece of mail, the feeder exit sensor 42 is also operable to detect the trailing edge of the piece. By monitoring the time interval between detection of the leading edge and the trailing edge the device is able to determine the length of the piece as it is transported past the feeder exit sensor 42.

Imaging Section

The imaging section 45 comprises a line scan camera 46 for scanning at least a portion of one face of each piece of mail. Preferably, the line scan camera 46 scans the front face of each piece of mail to acquire image data corresponding to the address. In addition, it may be desirable to obtain image data corresponding to an area on the mail referred to as a clear zone. This is an area that should be free of printing to conform with certain postal regulations.

The camera 46 is directed toward a mirror 47 that reflects the images of the mail as it passes a plate 49 that is located along the transport path. The plate has an aperture so that the mail conveyed past the plate is exposed to the camera 46. A roller 48 having a resilient outer surface, such as foam rubber, confronts the plate 49 forming a nip for receiving the mail being transported through the imaging section. Because the outer surface of the roller 48 is resilient, the roller urges the mail flush against the plate to ensure that the mail is a fixed distance from the camera, for proper focusing, as the mail passes the aperture in the plate. A pair of lights straddling the aperture in the plate may be provided to illuminate the surface of the mail as the mail passes by the aperture. Each light may comprise a plurality of fiber optic strands oriented in a single plane to provide a focused linear beam of light along the aperture.

The imaging camera 46 is a high resolution line scan camera suitable to achieve a 200×200 dpi image resolution. The acquisition rate of the camera is matched to the system transport speed so that a 200×200 dpi image resolution is achieved. The imaging camera 46 scans the pieces of mail and acquires data representing the light intensity at discrete points of each piece of mail. For each point, or pixel, the light intensity is represented by a gray scale number ranging from zero for black to 255 for white. The light intensity for each pixel is communicated to the computer as an eight bit representation corresponding to the gray scale number.

The image data is transferred to the system computer 110, which analyzes the image data to determine the presence of particular characteristics. First, the computer utilizes a multiline optical character reader ("MLOCR") in an attempt to identify the address on the piece of mail. In addition, the computer may analyze the image data to detect whether any printing or marks are in the clear zone of the piece of mail.

The gray scale data is preferably binarized to create a black and white representation of the image. By binarizing the data, the data for each pixel is converted from an eight bit gray scale representation to a one bit black or white representation, which significantly reduces the amount of image data. In addition, binarizing the image data operates to highlight the textual portions of the image, which is advantageous for further processing of the image data.

To binarize an image, the gray scale data for each pixel of the image is compared with a threshold. If the gray scale number for a pixel is above the threshold, the gray scale is converted to white. Conversely, if the gray scale number is below the threshold, the gray scale is converted to black.

Buffer

From the imaging section 45, the mail is transported to the buffer 50, which holds the mail, as necessary, while the system computer 110 analyzes the image data for the mail. The buffer 50 may be one of a variety of configurations. Preferably, the buffer 50 comprises two parallel paths 54, 64 that receive mail from the imaging section 45. The entrance to the buffer is a single path that diverges into the two parallel paths 54, 64. A gate 52 pivotable between two positions guides the incoming mail into either the first path 54 or the second path 64. A plurality of justifier rollers 56, 66 are disposed along the first and second paths 54, 64. The justifiers displace the mail downwardly and forwardly to justify the mail against a flat surface so that the height of the lower edge of each piece of mail is consistent. A pair of buffer sensors 58, 68 are disposed along the parallel paths 54, 64 to detect mail as it is conveyed through the buffer.

Each buffer path 54, 64 operates similarly. Accordingly, the following description of the operation of the first path 54 is also applicable to the second path 64 and its similar elements. As a piece of mail is conveyed from the imaging section 45 to the first path 54, the system computer 110 analyzes the image data for the piece of mail to determine the address printed on the piece. If the system computer 110 has not determined the address for the piece by the time the piece passes by the buffer sensor 58, the system controller 100 brakes the first path to stop the piece in the first path. Specifically, the system controller ramps down the speed of the first path so that the leading edge of the piece of mail enters a buffer pullout nip 59. If the system computer 110 determines the address of the piece while the piece is slowing down, preferably the piece does not stop in the first path. Instead, the piece continues through the first path, and the system controller starts the buffer pullout nip 59, which pulls the piece out of the first path into an angled first exit path that converges with a similarly angled second exit path.

If the system computer 110 does not determined the address for the piece while it slows down in the first path, the piece stops and is held in the first path until the system computer determines the address for the piece. Once the address is determined, the system controller 100 starts the first path 54 and the buffer pullout nip 59, and the piece of mail is transported out of the buffer 50 to the printer 80.

The system computer 110 can analyze the data for two pieces of mail while the pieces are held in the first and second paths 54, 64 of the buffer 50. For instance, a first piece may be scanned and conveyed into the first path 54 while the system computer 110 determines the address for the piece. While the first piece is in the first path 54, a second piece can be scanned and conveyed into the second path 64. In this scenario, the system computer 110 analyzes the image data for both pieces of mail. The pieces are then conveyed out of the buffer in the order in which the system computer determines the corresponding addresses. For instance, if the system computer 110 first determines the address for the piece of mail in the second path 64, the piece is conveyed out of the buffer first even though it entered the buffer after the piece in the first path. A subsequent piece of mail is then conveyed into the second path to replace the piece that exited the second path.

In the above description, the system computer 110 is described as processing the image data for both documents in the buffer. Alternatively, and preferably, the system computer 110 processes the image data for the piece of mail in one of the two paths 54, 64, while a separate imaging computer 120 processes the image data for the piece of mail in the other buffer path. Instead of a separate computer, the system computer 110 can include a pair of processors, one assigned to process the image data for each of the paths.

Labeler/Printer/Verifier/Stacker

From the buffer 50 the mail is conveyed to a printer 70, which prints POSTNET barcodes on the mail. Prior to printing the POSTNET code on a piece of mail, it may be desirable to apply a blank label to the piece. Accordingly, preferably the device includes a labeler 70 disposed along the transport path 40 between the buffer 50 and the printer 80. The labeler 70 is operable to apply a label to a piece of mail as it is conveyed along the transport path. The labeler 70 can be adjusted to vary the height at which the labels are applied to the mail, so that the vertical position of the label on the mail can be varied from batch to batch.

A printer sensor 82 disposed along the system transport 40 senses the leading edge of a piece of mail as it exits the labeler 70. The printer sensor 82 operates as a trigger to prepare the printer 80 to print information on the mail piece. The printer 80 is an inkjet printer. If the address for the mail piece is determined, the printer 80 sprays the appropriate POSTNET barcode on the piece. If the computer did not determine the address for the piece, the printer may print a unique identification number onto the piece, which can be used during subsequent reject processing.

From the printer 80 the mail is conveyed past a verifier 85. The verifier scans each piece to determine whether a POSTNET code was properly printed on the piece. In the present instance, the verifier 85 is configured substantially similar to the imaging section 45, using a line scan camera to scan the pieces as they are conveyed along the transport path 40. The verifier can operate in one of several ways. For instance, the verifier 85 can scan the piece to determine whether a POSTNET code was printed on the piece, and whether the printed POSTNET code conforms to the regulations governing the print resolution, bar sizes, bar spacing, number of bars, etc. for a proper POSTNET code. The verifier 85 reads the barcode and compares it to the previously determined address for the piece to ensure the barcode was properly printed.

From the verifier 85, the mail is conveyed around a U-turn 90 and to a stacker 95 having a plurality of output bins 96, 97, 98,99. Preferably, all of the mail that is rejected during processing is sorted into one bin. The rest of the mail is sorted into the remaining bins according to different criteria that are selected for the batch of mail. For instance, pieces having an 11 digit ZIP code can be sorted to one bin, pieces having a five digit ZIP code can be sorted to another bin, and pieces needing to be re-run can be sorted to yet another bin. In addition, additional bins can be added to the stacker 95 if desired.

Method of Operation

At startup, the device 10 is clear of any mail. A stack of mail 5 is placed on the conveyor 22 in the feeding module 20, preferably with the mail oriented so that the front face of each piece of mail (i.e. the face on which the address is printed) faces toward the pre-feeding belts 24. The feeder 30 feeds the first piece of mail into the transport pullout nip 41, which drives the piece forwardly into the imaging section 45. The camera 46 scans the piece, and the piece enters the buffer 50. The buffer gate 52 directs the piece into the first path 54. As the first piece enters the buffer 50, the feeder 30 feeds the second piece of mail from the stack and into the pullout nip 41. The second piece is then scanned at the imaging section 45 and conveyed into the buffer 50. The buffer gate 52 pivots into a second position and deflects the second piece into the second path 64. As the second piece enters the buffer 50, the feeder 30 advances the third piece of mail in the stack 5 until the leading edge of the third piece blocks the feed staging sensor 39. The third piece is then held or staged at the feeder until one of the first two pieces is conveyed out of the buffer 50.

The first piece of mail is maintained in the first path 54 of the feeder while the system computer 110 analyzes the image data obtained from the camera 46 to determine the address printed on the first piece. At the same time, the second piece of mail is maintained in the second path 64 of the feeder while the system computer 110 analyzes the image data obtained from the camera 46 to determine the address printed on the second piece. As soon as the system computer 110 determines the address for the first or second piece of mail, the system controller 100 starts the appropriate conveyor in the buffer to convey the piece out of the buffer. Simultaneously, the system controller 100 starts the feeder 30 and system transport pullout nip 41 so that the third piece is advanced through the imaging system and into the buffer to replace the piece that was conveyed out of the buffer.

The system controller 100 controls the position of the buffer entrance gate 52 in response to a piece being conveyed out of the buffer, so that the gate directs the next piece into the buffer path from which the previous piece exited. Once the third piece clears the feed staging sensor 39, the system controller 100 starts the conveyor 22 to advance the stack of mail so that the feeder 30 advances a fourth piece to stage the fourth piece in the feeder 30. In this way, the system controller 100 monitors the flow of mail in response to the status of the mail in the buffer.

As described above, the mail is conveyed out of the buffer 50 in the order in which the addresses are determined rather than the order in which the mail enters the buffer. In other words, if it takes an extended period of time to determine the address for a piece in one of the buffer parallel paths 54, 64, several pieces may be advanced through the other buffer parallel path in the meantime. For example, if a first piece staged in the first path 54 of the buffer takes 700 milliseconds to process, and a second piece in the second path 64 takes 100 milliseconds to process, the piece in the second path is advanced and a third piece is advanced into the second path 64. If the third piece also only takes about 100 milliseconds to process, the third piece will be conveyed out of the second path while the first piece is still maintained in the first path. In this example, at least two pieces, and potentially more, are conveyed through the second path 64 of the buffer 50 while the first piece is maintained in the first path.

As described above, a piece of mail is maintained in the buffer until the system computer 110 determines the address for the piece. However, preferably there is a maximum time period for determining the address. If the system computer is unable to determine the address within the maximum time period, the piece is electronically tagged as a reject and advanced out of the buffer 50. As the rejected piece is conveyed out of the buffer, the piece staged at the feeder 30 is advanced so that it is scanned in the imaging section 45 and conveyed into the buffer.

From the buffer 50, the piece of mail is conveyed past an optional labeler 70, which may selectively apply a label to the piece. The printer 80 then prints the appropriate POSTNET code on the piece, and the verifier 85 scans the piece to ensure the POSTNET barcode was properly printed. Preferably, the amount of time that it takes to convey the piece from the verifier 85 to the stacker 95 is sufficient to analyze the image data from the verifier. If the verifier is unable to finish analyzing the image data corresponding to the POSTNET barcode, or if the verifier determines that the barcode was not properly printed, then the piece is electronically tagged as a reject and sorted into one of the stacker bins with any other rejects.

In the foregoing discussion, the buffer 50 has been described as having two parallel paths. This configuration efficiently balances several design criteria, including throughput rate, size, and cost. However, other buffer configurations can be utilized. For instance, the number of buffer paths can be increased or decreased. If a single path buffer is used, the buffer may be a straight-through transport path from the imaging section, which is controlled by the system controller to stage the pieces as necessary.

By decreasing the number of buffer paths to one, the device can only process the image for one piece at a time if the imaging section is configured in the manner illustrated in FIG. 2. This may decrease throughput when it takes an extended time to read a particular piece of mail, because the device cannot process any further pieces during the delay. In other words, using a single path buffer decreases the cost and complexity of the device, but it also decreases the potential throughput rate of the device. Nonetheless, such a single pass buffer can still recognize the advantage of optimizing the time for processing a particular piece by advancing the piece out of the buffer when the address is determined, rather than holding the piece for a pre-set period.

As noted, the number of buffer paths can be increased. For instance, three parallel paths can be incorporated into the buffer, along with two gates to direct the incoming mail. Doing so increases the potential throughput of the device, but the size and cost of the device increases as well.

Rather than using parallel paths, the buffer can incorporate serial paths. Using serial paths, the mail is conveyed through a first path and then a second path in the buffer. For instance, a first piece is conveyed through the first path, then is staged in the second path. A second piece is then staged in the first path. If the address for the first piece is determined first, it is conveyed out of the second path and the second piece is conveyed into the second path while the computer continues to analyze the image data for the second piece. Conversely, if the address for the second piece is determined first, it can be transferred into the second conveyor and staged there with the first document, and a third document can be conveyed into the first path. Once the address for the first piece is determined, both the first and second pieces are conveyed out of the buffer. Alternatively, if the address for the second piece is determined first, it can be maintained in the first path while the computer continues to process the image data for the first piece. Once the address for the first piece is determined, the first and second pieces are conveyed out of the buffer and two new pieces are conveyed into the buffer.

A variation on the single path buffer can also be used. Such a buffer incorporates an elongated variable speed conveyor capable of receiving more than one envelope. The buffer serially receives a first piece, and conveys the piece at a certain rate while the computer processes its image data. After the piece passes a sensor along the buffer path, another piece is conveyed into the buffer. Once the computer determines the address for the first piece, the system controller 100 speeds up the buffer conveyor to discharge the first piece from the buffer. If the address for the second piece is already determined, the buffer conveyor continues to advance the second piece at the increased rate until the second piece is discharged from the buffer. If the address for the second piece is not yet determined, the buffer conveyor can be slowed. In addition, if desired, a staging sensor can be disposed along the buffer so that the buffer conveyor slows or stops if the piece passes a sensor and the computer has not yet determined its address.

Figure 7:
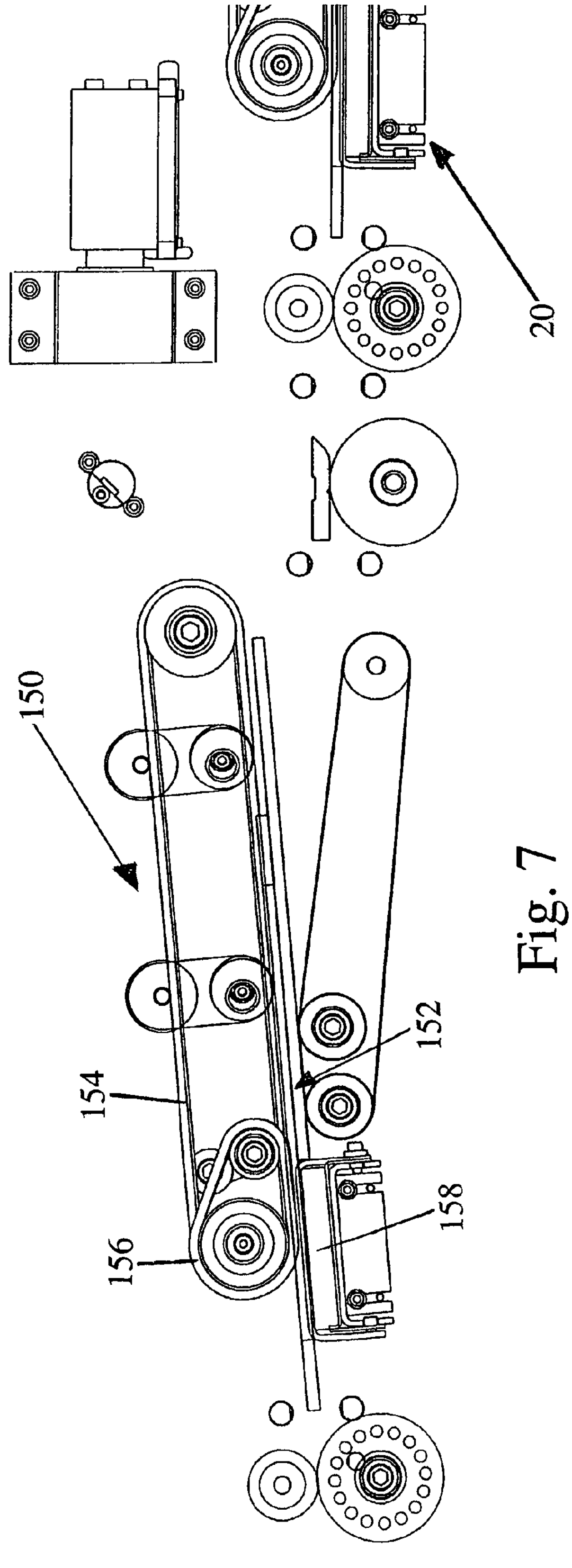
FIG. 7 is a plan view of a device for processing bulk mail similar to the device illustrated in FIG. 1, incorporating an alternate buffer.

Still other buffers can be utilized. For instance, referring to FIG. 7, a stacker buffer 150 is illustrated. The pieces are stacked into a short stack in a stacking area 152 while the computer processes the image data for the pieces. A feeder 156 then serially feeds the pieces from the stack.

The stacker buffer 150 comprises pre-feed belts 154, a feeder 156 and a retard 158 that are significantly similar to the pre-feed belts 24, feeder 30 and retard 38 described previously in connection with the feeding module 20. The stacker buffer 150 utilizes a first in first out (FIFO) process. The pieces are staged in the stacking area while the address is determined for the first piece in the stack. The feeder 30 then feeds the first piece in the stack. The feeder continues feeding pieces in the stack until encountering a piece for which the address is not determined. The feeder then stops again until the address is determined for the top piece in the stack. As with the parallel path buffer 50, a piece is fed from the feeder module 20 and through the imaging section in response to the determination to advance a piece out of the buffer. However, the stacker buffer 150 differs in that a piece is not necessarily conveyed out of the buffer as soon as its address is determined.

The following example illustrates the operation of the stacker buffer 150. A first piece is conveyed into the stacker buffer. While the computer processes the image data for the first piece, a second piece is conveyed into the stacker buffer to form a two-piece stack with the first piece on top of the second piece. A third piece is then conveyed into the stack in the stacker buffer, so that the third piece is beneath the second piece. While the three pieces are in the stacker buffer, the computer continues to process the image data for the pieces. For instance, the computer processes the image data for the first and second pieces to determine the addresses for the first two pieces. If the computer determines the address for the second piece before determining the address for the first piece, the computer begins processing the data for the third piece while continuing to process the data for the first piece. Once the computer determines the address for the first piece, the system controller starts the buffer feeder 156 and feeds the first piece out of the buffer 150. After feeding the first piece, the feeder 156 feeds the second piece since the address for the second piece was already determined. Similarly, if the address for the third piece has been determined, the feeder continues to run, feeding the third piece out of the buffer. If the address for the fourth piece in the buffer stacker has not yet been determined, the system controller stops the stacker feeder 156 and the fourth piece becomes the top piece in the buffer stacker while the computer determines the address. When the buffer feeder 156 feeds subsequent pieces in succession, the buffer feeder delays between feeding subsequent pieces to control either the gap or the pitch between successive pieces.

From the foregoing, it is evident that a number of different buffers can be utilized in the device. Each of the buffers described above operates to hold or maintain pieces of mail while the computer processes image data for the pieces. The system controller operates to control the flow of documents so that a piece of mail from the stack of mail in the feeder module is fed into the flow of mail as a piece of mail is discharged from the buffer.

Clear Zone Detection

The device 10 may be in utilized to scan the mail to determine whether each piece has any printing in a predefined clear zone area. This clear zone detection can be accomplished in combination with the address scan or as a separate process. In either instance, the computer analyzes the image data corresponding to a predefined area. If the computer determines that there are markings or printing in the predefined area on a piece of mail, the piece is electronically tagged as requiring a label or as being a reject. The labeler 70 then applies a blank label to each tagged piece of mail so that the clear zone area is substantially free from markings or printing.

Unless the piece is tagged as a reject, if clear zone detection is done in combination with address detection, the mail is processed as follows. While a piece is staged in the buffer, if necessary, the computer analyzes the image data to determine the address for the piece and to determine whether the predefined clear zone area is clear. If the address is determined and the clear zone is clear, the printer 80 prints the POSTNET barcode on the piece in a predetermined area, and no label is applied to the piece. If the address is determined and the clear zone is not clear, the labeler 70 applies a blank label to the clear zone area and the printer 80 prints the POSTNET barcode on the piece in a predetermined area, which could coincide with the clear zone area. If the address is not determined and the clear zone is clear, a label is not applied to the envelope, but the printer optionally prints a unique identification tag that is used during reject processing as described below. If the address is not determined and the clear zone is not clear, the labeler 70 optionally applies a label to the mail piece in the clear zone area and the printer 80 optionally prints a unique identification tag that is used during reject processing. If the device does not include a labeler 70, pieces that do not have a clear zone may be electronically tagged as rejects and sorted in the stacker 95 with any other rejects in the batch of mail.

Reject Processing

When processing a batch of mail, it is possible that the computer will not be able to determine the address for one or more pieces of mail. These pieces can be processed in one of several ways. In a preferred mode, if the computer is unable to determine the address for a piece, the printer 80 prints a barcode on the piece that corresponds to a unique identification number for the piece. These rejected pieces are sorted together and processed separately using a process referred to as video encoding. Specifically, the image data for the rejected pieces is exported for use during reject processing. An operator then views the images for the rejected pieces and manually keys in the necessary address information so that the address information for a particular piece is associated with the barcode that was sprayed onto the piece during the first pass through the device 10.

The rejected mail is then re-fed through the device 10. During this second pass through the device, the computer analyzes the image data to read the barcode printed on the piece during the first pass, rather than attempting to read the address. Since barcodes are generally easier to read then optical characters, the computer is able to read substantially all of the barcodes on the pieces during the second pass. After the computer reads the barcode for a piece of mail, the data that was manually keyed in is retrieved. This information is then used to determine the appropriate POSTNET barcode to be sprayed on the piece.

The barcode that was printed on the rejected pieces during the first pass could overlap or interfere with the POSTNET code that is to be printed on the pieces. Accordingly, during the second pass, preferably the labeler 70 applies a label over the barcode that was printed on the pieces for reject processing. The printer 80 then prints the appropriate POSTNET code onto a label on each piece.

Alternatively, the device may scan for a clear area on the piece in which the reject processing barcode can be printed so that it does not interfere with the POSTNET barcode that is subsequently printed on the piece. This may eliminate the need to apply a label over the reject processing barcode. To accomplish this, the computer analyzes the image data for the piece during the first pass to locate two areas: the clear zone area in which the POSTNET code is to be printed, and a second area that is separate from the clear zone.

Both of these areas are located within the vertical range in which the printer can print on the piece. In other words, the second area can be vertically or horizontally separated from the clear zone area, but both areas are located within the vertical range of the printer to ensure that the printer can print in each area. If the computer determines that the second area is clear during the first pass, the reject processing barcode is printed in the second area. During the second pass, the POSTNET code is then printed in the clear zone, without the need to apply a label over the reject processing barcode Depending on the number of rejects that are expected during the processing of a batch, it may be desirable to manually key in the address information during the first pass, as necessary. Specifically, the device may include a display screen for viewing the image of a piece of mail while it is staged in the buffer 50, if the computer cannot determine the address for the piece. While viewing the image of the piece, the operator manually keys in the necessary address information while the piece is staged in the buffer. The piece is then advanced out of the buffer and processed in accordance with the steps described above in which the computer determined the address of the piece.

If the necessary information for a piece is manually keyed in while the piece is staged in a path of the buffer, other pieces can continue to be scanned, read and conveyed through the other buffer path. However, while the operator is keying in information regarding a piece in the first buffer path, the computer may be unable to read a subsequent piece of mail, so that the subsequent piece is staged in the second buffer path, waiting for the operator to finish manually keying in the information regarding the first piece. This could cause an undesirable delay. To prevent such a delay, the system controller 100 may electronically tag the second piece as a reject and advance it out on the second buffer path, thereby allowing subsequent pieces to be scanned and read by the computer while the operator continues to key in information regarding the first on readable piece.

The terms and expressions which have been employed are used as terms of description and not of limitation. There is no intention in use of such terms and expressions of excluding any equivalents of the features shown and described or portions thereof. It is recognized, however, that various modifications of the embodiments described herein are possible within the scope and spirit of the invention. Accordingly, the invention incorporates variations that fall within the scope of the following claims.

The invention claimed is:

1. A method for processing documents comprising the steps of:

scanning a document and determining a characteristic of the document;

scanning a first area on the document to determine if the area is free from markings;

selectively adhering a label to the document if the first area includes a marking; and printing a marking onto the document, wherein the marking corresponds to the determined characteristic.

2. The method of claim 1 comprising the step of sorting the document in response to the determined characteristic.

3. The method of claim 1 comprising the step of scanning the document to verify that the marking was printed properly.

4. The method of claim 3 wherein the step of verifying comprises scanning the marking to obtain a set of image data and analyzing the image data for the marking to determine whether the printed marking correlates to a correct marking for the determined characteristic.

5. The method of claim 1 comprising the step of printing a second marking on the document.

6. The method of claim 5, wherein the step of adhering a label comprises adhering a label to the document so that the label covers the second marking.

7. The method of claim 1 comprising the step of maintaining the document in a buffer while the characteristic of the document is determined.

8. The method of claim 1 wherein the step of scanning the document comprises scanning the document with a camera to obtain image data corresponding to at least a portion of the document.

9. The method of claim 1 wherein the characteristic is an address printed on the document and the step of determining the characteristic comprises utilizing optical character recognition to determine the address on the document.

* * * * *